United States Patent
Tanase

(10) Patent No.: US 7,130,766 B2
(45) Date of Patent: Oct. 31, 2006

(54) ENERGY-SAVING EVALUATION APPARATUS, ECOLOGICAL DRIVING EVALUATION APPARATUS, ENERGY SAVING EVALUATION SYSTEM, ECOLOGICAL DRIVING EVALUATION SYSTEM AND METHOD THEREOF

(75) Inventor: Rento Tanase, Iwata-gun (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 10/876,861

(22) Filed: Jun. 25, 2004

(65) Prior Publication Data
US 2005/0143876 A1    Jun. 30, 2005

(30) Foreign Application Priority Data
Jun. 26, 2003    (JP)    ............................ P.2003-183381

(51) Int. Cl.
*G06F 19/00*    (2006.01)

(52) U.S. Cl. ....................................... 702/182; 324/512

(58) Field of Classification Search ........ 702/182–185, 702/188; 324/512
See application file for complete search history.

(56) References Cited

U.S. PATENT DOCUMENTS

2003/0171851 A1* 9/2003 Brickfield et al. .......... 700/286
2005/0021191 A1* 1/2005 Taniguchi et al. ............. 701/1

FOREIGN PATENT DOCUMENTS

| EP | 1396622 A1 | 10/2004 |
| JP | 2002-216291 | 8/2002 |
| JP | 2002-371877 | 12/2002 |

* cited by examiner

*Primary Examiner*—Edward Raymond
(74) *Attorney, Agent, or Firm*—Pillsbury Winthrop Shaw Pittman LLP

(57) ABSTRACT

In an energy-saving evaluation apparatus for evaluating energy conservation for a machine that is to be operated by a user, the energy-saving evaluation apparatus includes: a detection unit that includes a monitor device for measuring a running state of the machine, detects an operating state of the machine operated by the user through measuring the running state of the machine by the monitor device; and an evaluation unit that performs an energy-saving evaluation based on the detected operating state of the machine.

31 Claims, 8 Drawing Sheets

FIG. 3

< IS DETECTION TABLE TA1 >

| DETECTION CONDITION | CONTENTS |
|---|---|
| FIRST CONDITION | PERIOD FROM HALTING OF AN ENGINE TO STARTING OF THE ENGINE ≤ FIRST PREDETERMINED PERIOD |
| SECOND CONDITION | PERIOD FROM STARTING OF AN ENGINE TO DEPARTURE OF A VEHICLE ≤ SECOND PREDETERMINED PERIOD |
| THIRD CONDITION | AN ENGINE IS HALTED DURING TRAVELING |
| FOURTH CONDITION | AN ENGINE IS HALTED AND A PERSON IS PRESENT IN A VEHICLE |
| FIFTH CONDITION | AN ENGINE IS HALTED AND A KEY HAS BEEN INSERTED INTO AN ENGINE SWITCH |

FIG. 4

< ENERGY-SAVING TRAVELING DETECTION TABLE TA2 >

| DETECTION CONDITION | CONTENTS |
|---|---|
| FIRST CONDITION | FUEL CONSUMPTION RATE ≤ ENERGY-SAVING FUEL CONSUMPTION RATE |
| SECOND CONDITION | A VEHICLE IS TRAVELING WITHOUT ANY ACCELERATION |

FIG. 5

<COEFFICIENT MANAGEMENT TABLE TA3>

| | DETECTION CONDITION | COEFFICIENT |
|---|---|---|
| IDLING STOP | FIRST CONDITION | α1 |
| | SECOND CONDITION | α2 |
| | THIRD CONDITION | α3 |
| | FOURTH CONDITION | α4 |
| | FIFTH CONDITION | α5 |
| ENERGY-SAVING TRAVELING | FIRST CONDITION | β1 |
| | SECOND CONDITION | β2 |

FIG. 6

<VISUAL IMAGE CONVERSION TABLE TA4>

| EVALUATION INDEX RANGE | IMAGE TYPE |
|---|---|
| $a \leq Vd$ | FIRST IMAGE |
| $b \leq Vd < a$ | SECOND IMAGE |
| ........ | ........ |
| $Vd < z$ | n-TH IMAGE |

(IT SHOULD BE NOTED THAT $a > b > .... > y > z$)

FIG. 7

YOUR ATTITUDE TOWARDS DRIVING ECOLOGICALLY IS AT THE "HIGHEST LEVEL." (ECOLOGICAL DRIVING EVALUATION INDEX Vd = ...).

PLEASE RETAIN THIS ECOLOGICAL DRIVING ATTITUDE.

YOUR ATTITUDE TOWARDS DRIVING ECOLOGICALLY IS AT THE "SATISFACTORY LEVEL." (ECOLOGICAL DRIVING EVALUATION INDEX Vd = ...)

DON'T YOU SOMETIMES IDLE UNNECESSARILY? PLEASE ALWAYS KEEP ECOLOGICAL DRIVING IN MIND.

YOUR ATTITUDE TOWARDS ECOLOGICAL DRIVING IS AT THE "LOWEST LEVEL." (ECOLOGICAL DRIVING EVALUATION INDEX Vd = ...)

PLEASE TRY TO KEEP ECOLOGICAL DRIVING IN MIND.

FIG. 8

<PRIVILEGE GRANTING POINT CONVERSION TABLE TA5>

| EVALUATION INDEX RANGE | PRIVILEGE GRANTING POINTS |
|---|---|
| a ≤ Vd | m POINTS |
| b ≤ Vd < a | (m-1) POINTS |
| ...... | ...... |
| Vd < z | 0 POINTS |

(IT SHOULD BE NOTED a > b > .... > y > z)

FIG. 9

<USER POINT MANAGEMENT TABLE TA6>

| USER ID | USER'S ACCUMULATED POINTS | FUEL GRANTING POINTS |
|---|---|---|
| U-1 | XXX POINTS | XYZ POINTS |
| U-2 | YYY POINTS | XXY POINTS |
| ...... | ...... | ...... |

FIG. 10

```
USER A
FOR THE CURRENT TRAVELING DISTANCE..., THE FOLLOWING ARE YOUR ACCUMULATED POINTS AND
FUEL GRANTING POINTS.

<USER'S ACCUMULATED POINTS>
POINTS

<FUEL GRANTING POINTS>
POINTS
```

ENERGY-SAVING EVALUATION APPARATUS, ECOLOGICAL DRIVING EVALUATION APPARATUS, ENERGY SAVING EVALUATION SYSTEM, ECOLOGICAL DRIVING EVALUATION SYSTEM AND METHOD THEREOF

BACKGROUND OF THE INVENTION

The present invention relates to an energy-saving evaluation apparatus and an energy-saving evaluation system for evaluating energy conservation for a machine including an operating mechanism that is operated by using, as power, energy obtained by burning a fuel, an ecological driving evaluation apparatus and an ecological driving evaluation system for evaluating the ecological driving of a vehicle, such as an automobile and a method thereof.

Recently, the severity of the air pollution occasioned by noxious gases, such as $NO_x$, CO and $CO_2$, in the exhausts of automobiles and other motor vehicles has been increasing, and individual automobile companies, in compliance with exhaust emission restrictions, have developed various types of low-emission vehicles.

While taking this historical background into account, an idling stop apparatus (hereinafter referred to as an IS apparatus) has been developed in order to limit unnecessary idling, and presently, this IS apparatus is being produced commercially (e.g., see JP-A-2002-371877).

When a user driving a vehicle equipped with the IS apparatus stops the vehicle at a red traffic light and shifts gears from drive (D) to neutral (N), the engine of the vehicle is automatically stopped (an idling stop). Thereafter, to restart the engine, the user shifts gears to drive (D) and then to neutral (N). After the engine has restarted, the user can shift gears from neutral (N) to drive (D) and resume driving.

In addition to the IS apparatus, another system has been proposed that employs monitoring devices installed along a road to detect the state of all vehicles traveling or stopped on the road. To reduce unnecessary idling, when a vehicle in the idling state is detected, a warning is generated for the user of the subject vehicle (e.g., see JP-A-2002-216291).

According to these related examples, it is anticipated that their use will contribute to a reduction in unnecessary idling, and that users in vehicles will be encouraged to employ energy-saving procedures while traveling. However, individual user cannot apprehend how environmentally friendly their driving (ecological driving) is. This is a problem that applies in common to all users who control machine (e.g., planes, ships and power generator engines; hereinafter, all of them are generally referred to as "engine-mounted machine") powered by operating mechanisms driven by the energy produced by burning fuel.

SUMMARY OF THE INVENTION

To resolve this problem, it is one objective of the present invention to provide an energy-saving evaluation apparatus and an energy-saving evaluation system that can, in consonance with the effort made by individual users, evaluate (energy-saving evaluations) how environmentally friendly the users have operated engine-mounted machine.

It is another objective of the present invention to provide an ecological driving evaluation apparatus and an ecological driving evaluation system that can, in consonance with the effort made by individual users, evaluate (ecological driving evaluations) how environmentally friendly are the procedures employed by the users while operating engine-mounted machine.

In order to solve the aforesaid object, the invention is characterized by having the following arrangement.

(1) An energy-saving evaluation apparatus for evaluating energy conservation for a machine that is to be operated by a user, the energy-saving evaluation apparatus comprising:
a detection unit that includes a monitor device for measuring a running state of the machine, detects an operating state of the machine operated by the user through measuring the running state of the machine by the monitor device; and
an evaluation unit that performs an energy-saving evaluation based on the detected operating state of the machine.

(2) The apparatus according to (1), wherein the machine is powered by an operating mechanism driven by energy produced by burning fuel.

(3) The apparatus according to (1), wherein the evaluation unit performs the energy-saving evaluation based on the detected operating state of the machine over a predetermined period of time.

(4) The apparatus according to (3), wherein
the operating state includes an active state and a stop state,
the apparatus further comprises a counting unit that counts times whereat the machine is set to the stop state, and
the evaluation unit performs the energy-saving evaluation based on the number of times the stop state is detected during the predetermined period of time.

(5) The apparatus according to (3), wherein
the operating state includes an action state and a stop state,
the apparatus further comprises a measurement unit that measures a length of time whereat the machine is set to the stop state, and
the evaluation unit performs the energy-saving evaluation based on the length of time during the stop state is maintained during the predetermined period of time.

(6) The apparatus according to (2), wherein the machine is an electric power generator that is powered by an operating mechanism driven by the energy produced by burning fuel.

(7) The apparatus according to (2), wherein the machines is a transportation facility.

(8) The apparatus according to (7), wherein the transportation facility is one of a ship, a plane and a vehicle.

(9) The apparatus according to (8), wherein
the transportation facility is the vehicle, and
the detecting unit detects, as the operating state, whether the vehicle is in an idling stop state or not based on the running state of the vehicle measured by the monitor device.

(10) The apparatus according to (9) further comprising a counting unit that counts a number of times the vehicle is in the idling stop state,
wherein the evaluation unit performs the energy saving evaluation based on the number of times at which the idling stop state is detected during a predetermined time period.

(11) The apparatus according to (9) further comprising a measurement unit that measures a length of time the vehicle is in the idling stop state,
wherein the evaluation unit performs the energy saving evaluation based on the length of time the idling stop state is maintained during a predetermined period of time.

(12) The apparatus according to (10), wherein the detection unit detects whether an engine of vehicle is stopped or started based on the running state and determines the idling stop state when a period from the detection of the stop of the engine until the detection of the starting of the engine is less than a predetermined threshold value.

(13) The apparatus according to (11), wherein the detection unit detects whether an engine of vehicle is stopped or started based on the running state and determines the idling stop state when a period from the detection of the stop of the engine until the detection of the starting of the engine is less than a predetermined threshold value.

(14) The apparatus according to (10), wherein the detection unit detects whether an engine of the vehicle is stopped or started based on the running state and whether the vehicle is stopped or traveled based on the running state, and determines the idling stop state when a period from the detection of the starting of the engine until the detection of the traveling of the vehicle is less than a predetermined threshold value.

(15) The apparatus according to (11), wherein the detection unit detects whether an engine of the vehicle is stopped or started based on the running state and whether the vehicle is stopped or traveled based on the running state, and determines the idling stop state when a period from the detection of the starting of the engine until the detection of the traveling of the vehicle is less than a predetermined threshold value.

(16) The apparatus according to (10), wherein the detection unit detects whether an engine of the vehicle is stopped or started based on the running state and whether the vehicle is stopped or traveled based on the running state, and determines the vehicle is in the idling stop state when the stop of the engine is detected while the travel of the vehicle is being detected.

(17) The apparatus according to (11), wherein the detection unit detects whether an engine of the vehicle is stopped or started based on the running state and whether the vehicle is stopped or traveled based on the running state, and determines the vehicle is in the idling stop state when the stop of the engine is detected while the travel of the vehicle is being detected.

(18) The apparatus according to (9), wherein the running state of the vehicle include a velocity of the vehicle and a number of revolutions of an engine of the vehicle, and the heat, vibrations and sounds generated by the engine.

(19) The apparatus according to (9), wherein the detection unit detects a presence of the user in the vehicle and whether an engine of the vehicle is stopped or started based on the running state, and determines the vehicle is in the idling stop state when both the stop of the engine and the presence of the user in the vehicle are detected.

(20) The apparatus according to (9), wherein the detection unit determines whether a key is inserted into an engine switch in the vehicle to change the state of engine based on the running state, and determines the vehicle is in the idling stop state when both the stop of the engine and the presence of the key in the engine switch are detected.

(21) The apparatus according to (8), wherein
the transportation facility is the vehicle,
the detection unit includes a calculation unit that calculates a fuel consumption rate for an engine of the vehicle based on a travel distance of the vehicle and an amount of fuel consumed during the travel,
the apparatus further comprises a measurement unit that measures, as an energy-saving traveling period, a length of period at which the fuel consumption rate is smaller than a predetermined threshold value, and
the evaluation unit performs the energy-saving evaluation based on the energy-saving traveling period.

(22) The apparatus according to (21), wherein the measurement unit measures, as an energy-saving traveling distance, the travel distance of the vehicle for which the fuel consumption rate is smaller than the predetermined threshold value; and the evaluation unit performs the ecological driving evaluation based on the energy-saving traveling distance.

(23) The apparatus according to (8), wherein
the transportation facility is the vehicle,
the detection unit detects whether the vehicle is stopped or traveled based on the running state of the vehicle that are measured by the monitor device, and determines whether an acceleration operation is performed for the vehicle,
the apparatus further comprises a measurement unit that measures, as a energy-saving traveling period, a period at which the travel of the vehicle is detected and it is determined that the acceleration operation is not performed, and
the evaluation unit performs the energy saving evaluation based on the energy-saving traveling period.

(24) The apparatus according to (23), wherein
the measurement unit detects a traveling distance of the vehicle detects a traveling distance of the vehicle in a period at which the vehicle is traveled and the acceleration operation is not performed, and defines the obtained traveling distance as an energy-saving traveling distance,
the evaluation unit performs the energy-saving evaluation based on the energy-saving traveling distance.

(25) The apparatus according to (1) further comprising a notification unit that notifies the user of the results of the energy saving evaluation.

(26) A method of evaluating energy conservation for a machine that is to be operated by a user, the method comprising the steps of:
measuring a running state of the machine;
detecting an operating state of the machine operated by the user based on the measured running state; and
performing an energy-saving evaluation based on the detected operating state of the machine.

(27) An energy-saving evaluation system comprising:
an energy-saving evaluation apparatus for evaluating energy conservation for a machine that is to be operated by a user, the energy-saving evaluation apparatus including:
a detection unit that includes a monitor device for measuring a running state of the machine, detects an operating state of the machine operated by the user through measuring the running state of the machine by the monitor device,
an evaluation unit that performs an energy-saving evaluation based on the detected operating state of the machine, and
a transmission unit that transmits energy-saving evaluation information representing the result of the energy-saving evaluation to a privilege granting server; and
the privilege granting server that provides privileges to the user according to accumulated points, the privilege granting server including,
a reception unit that receives the energy-saving evaluation information from the transmission unit,
a storage unit that stores the accumulated points, and
a control unit that obtains privilege points based on the energy-saving evaluation information, and employs the obtained privilege points to update the accumulated points.

(28) The system according to (27), wherein the transmission unit transmits the energy-saving evaluation information with adding identification information for the user thereto.

(29) The system according to (28), wherein the control unit updates the accumulated points that corresponds to the identification information added to the energy-saving evaluation information to be employed by the control unit.

(30) The system according to (27), wherein the transmission unit transmits the energy-saving evaluation information to the reception unit through a communication network.

(31) The system according to (27), wherein the machine is a vehicle, the detection unit determines whether the vehicle is in an idling stop state or not based on the running state of the vehicle, and the evaluation unit performs an ecological driving evaluation as the energy-saving evaluation based on the determination result of the detection unit.

(32) A method comprising the steps of:

measuring a running state of a machine that is to be operated by a user;

detecting an operating state of the machine operated by the user based on the measured running state;

performing an energy-saving evaluation based on the detected operating state of the machine;

transmitting an energy-saving evaluation information representing the results of energy-saving evaluation through a communication network;

receiving the energy-saving evaluation information;

obtaining privilege points based on the received energy-saving evaluation information;

updating, based on the obtained privilege points, the accumulated points according to which privileges are provided to the user; and storing the updated accumulated points.

BRIEF DESCRIPTION OF THE DRAWINGS

FIG. 3 is a diagram showing an example IS detection table TA1 according to the embodiment.

FIG. 4 is a diagram showing an example energy-saving traveling detection table TA2 according to the embodiment.

FIG. 5 is a diagram showing an example coefficient management table TA3 according to the embodiment.

FIG. 6 is a diagram showing an example visual image conversion table TA4 according to the embodiment.

FIG. 7 is a diagram showing example images displayed on a display unit according to the embodiment.

FIG. 8 is a diagram showing an example privilege granting point conversion table TA5 stored in a privilege granting database according to the embodiment.

FIG. 9 is a diagram showing an example user point management table TA6 stored in a privilege point accumulation database according to the embodiment.

FIG. 10 is a diagram showing an example screen displayed on the display unit according to the embodiment.

DETAILED DESCRIPTION OF PREFERRED EMBODIMENTS

The preferred embodiment of the present invention will now be described with reference to the accompanying drawings.

A. Embodiments

Figure 1:
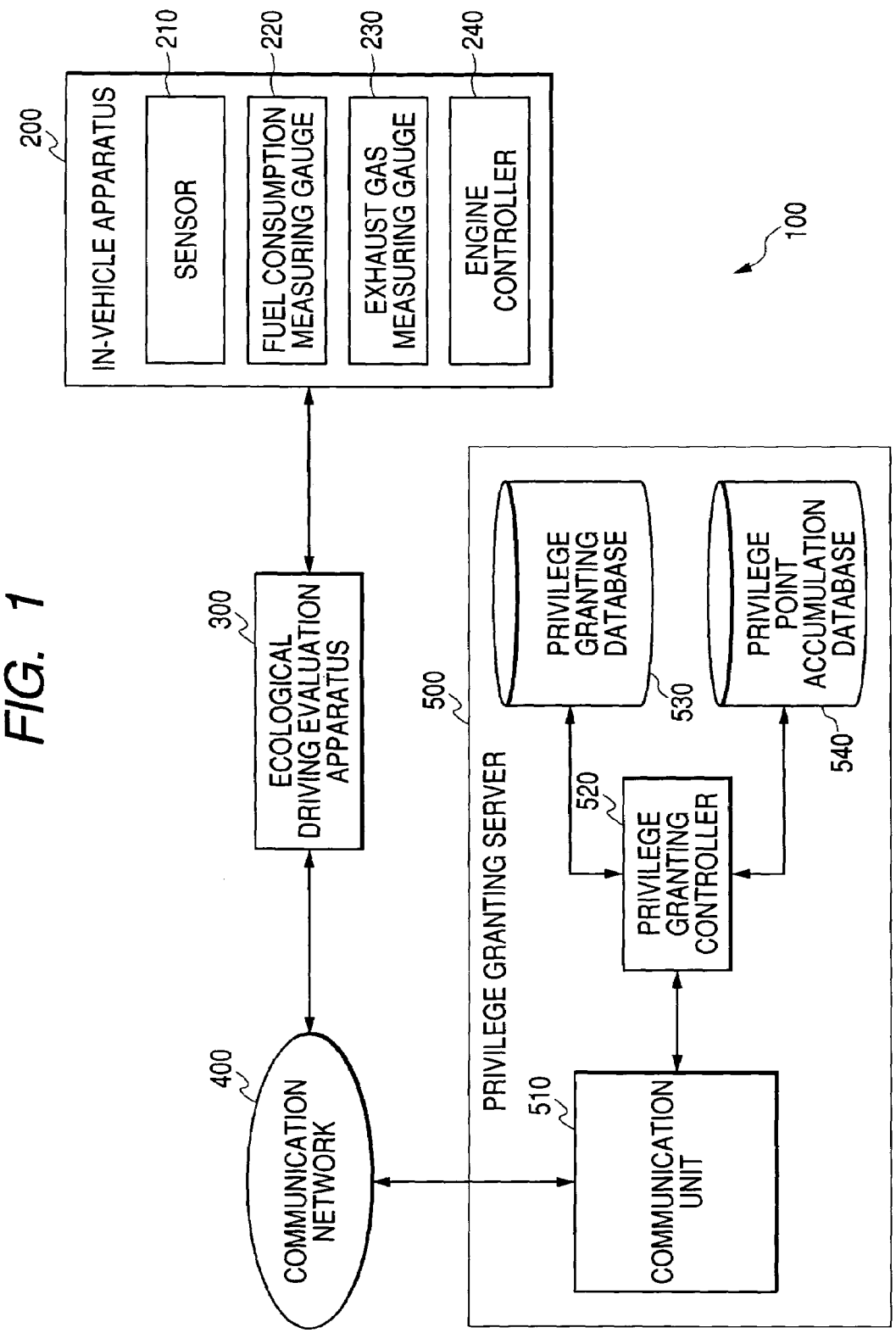
FIG. 1 is a diagram showing the configuration of an ecological driving evaluation system according to one embodiment of the present invention.

FIG. 1 is a diagram showing the configuration of an ecological driving evaluation system 100 according to the embodiment of the invention.

The ecological driving evaluation system 100 enables a user who is driving a vehicle to apprehend how environmentally friendly his or her driving is (ecological driving), and provides a service for granting various privileges in accordance with the results obtained by an ecological driving evaluation, which will be described later.

The ecological driving evaluation system 100 includes: an in-vehicle apparatus 200 mounted on a vehicle driven by a user; an ecological driving evaluation apparatus 300 for receiving, through a communication medium (regardless of whether it is wired or wireless), various physical quantities (running state) which will be described later, such as fuel consumption, vibrations and sounds, for the vehicle that are measured by the in-vehicle apparatus 200; and a privilege granting server 500, for receiving, through a communication network (e.g., the Internet) 400, the ecological driving evaluation results obtained by the ecological driving evaluation apparatus 300, and for providing various privileges in accordance with the effort of the user to drive ecologically. In this embodiment, an automobile is employed as a vehicle driven by a user; however, the embodiment can also be applied for any other vehicle, such as a motorcycle, that consumes fuel while traveling.

<In-vehicle Apparatus 200>

A sensor 210 includes: a microphone used to collect sounds generated by an engine; a vibration accelerometer for detecting vibration acceleration in the upper, lower, right and left directions generated during the travel of the vehicle; a human sensor for detecting whether a person is present in the vehicle; a switch state detector for detecting the state of an engine switch (e.g., whether a key has been inserted into the engine switch, or whether the engine switch is in the ON state); and an acceleration state detector for detecting the acceleration state of the vehicle.

A fuel consumption measuring gauge 220 includes a measurement device for observing a primary signal for activating an injector (a fuel injection device), measuring an operation period to obtain the amount of fuel consumed, and calculating fuel consumption based on the obtained amount of the fuel consumed and a travel distance measured by an odometer (not shown).

An exhaust gas measuring gauge 230 includes a measurement device for measuring the type, the density and the component ratio of gas exhausted by the vehicle.

An engine controller 240 is constituted by an ECU (Engine Control Unit) and controls the engine operation of the vehicle in a concentrated manner. The engine controller 240 receives, from sensors (not shown), various signals (e.g., an intake air volume signal, a throttle signal, an engine revolution signal, an exhaust temperature sensor signal and a vehicular velocity signal; hereinafter collectively referred to as "engine control signals"), and provides controls, including fuel injection control and ignition time control, for the operation of the engine.

<Ecological Driving Evaluation Apparatus 300>

Figure 2:
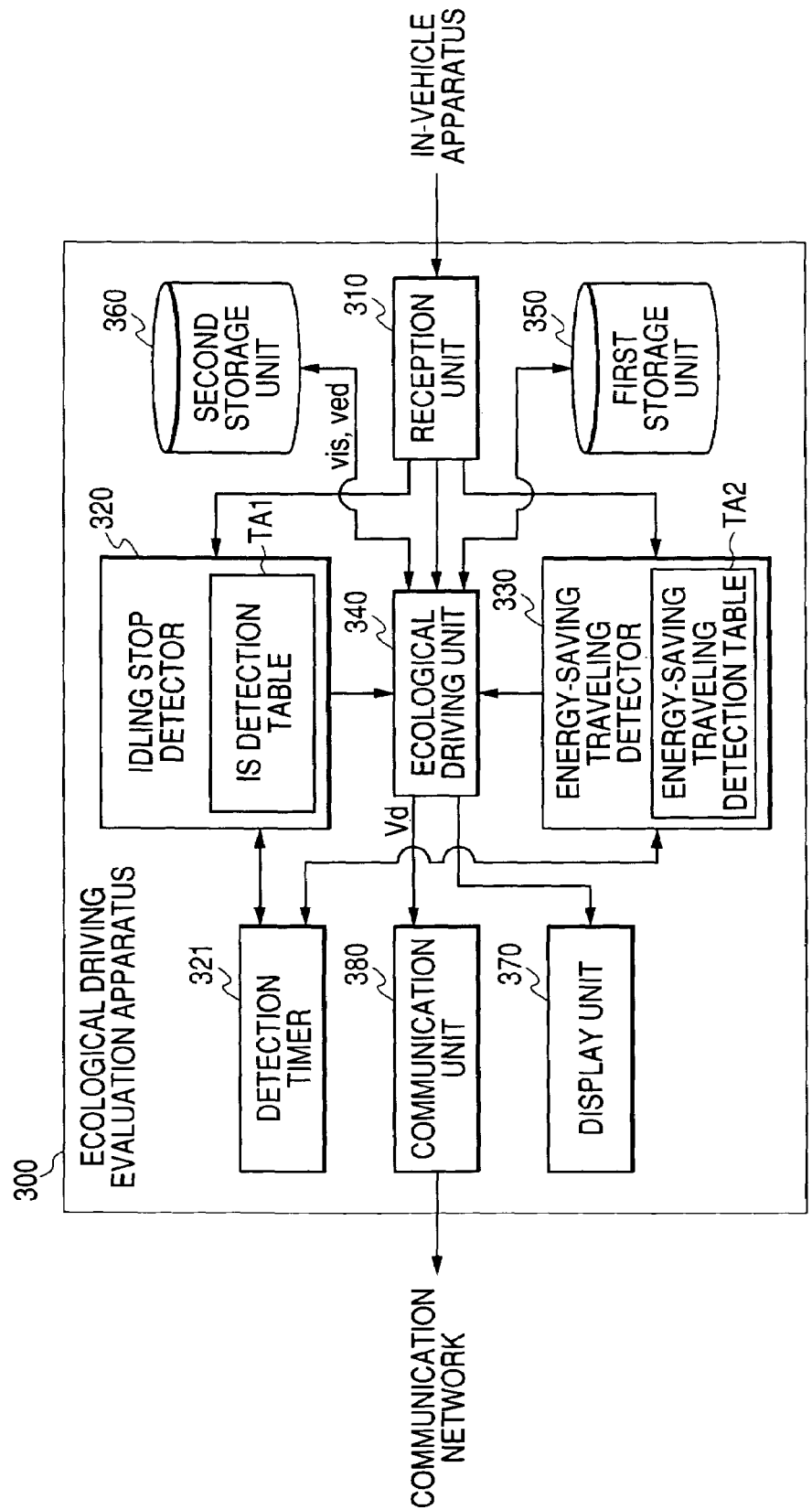
FIG. 2 is a diagram showing the configuration of an ecological driving evaluation apparatus according to the embodiment.

FIG. 2 is a diagram showing the configuration of the ecological driving evaluation apparatus 300.

A reception unit 310 receives, through the communication medium, various running states of a vehicle that are measured by the in-vehicle apparatus 200. Specifically, the reception unit 310 receives, from the sensor 210, an engine sound signal representing engine sounds, a vibration acceleration signal representing the vibration acceleration of a vehicle, a human sensor signal representing the presence of a person in the vehicle, an engine switch state detection signal representing the state of an engine switch and an acceleration state detection signal representing the acceleration state of the vehicle; receives from the fuel consumption measuring gauge 220 and the exhaust gas measuring gauge 230, respectively, a fuel consumption signal representing the fuel consumption of the vehicle and an exhaust gas signal representing the density of an exhaust gas; and receives from the engine controller 240 various engine control signals described above.

An idling stop state detector 320 includes an idling stop detection table (hereinafter referred to as an IS detection gable) TA1 shown in FIG. 3. The idling stop state detector 320 compares, with individual conditions (first to fifth conditions) entered in the IS detection table TA1, signals that are received by the reception unit 310 and that represent the individual running states of the vehicle, and determines whether the vehicle is in the idling stop state. An "idling stop", is an action of turning off the engine when the driver doesn't actually need to let the engine idling. A detection method using these conditions will now be described in detail.

a-1. Detection Using a First Condition

First, the idling stop detector 320 detects the stopping/starting of the engine based on an engine revolution signal included in the engine control signals. When the number of engine revolutions indicated by the engine revolution signal is "0" and the idling stop detector 320 determines that the engine is currently stopped, the idling stop detector 320 starts the measurement of the period the engine is stopped with employing a detection timer (see FIG. 2) 321. Thereafter, when the idling stop detector 320 detects the starting of the engine, in accordance with the engine revolutions indicated by an engine revolution signal, the idling stop detector 320 terminates the measurement of the period the engine is stopped. Then, the idling stop detector 320 determines whether the measured time for the engine stopped period was within a period represented by a first predetermined time (e.g., three minutes).

Through this determination process, the idling stop detector 320 determines whether the engine was stopped for an idling stop, or whether the engine was stopped while the vehicle was simply being parked in a parking lot. When the measured engine stopped period of the engine is within the first predetermined period, the idling stop detector 320 determines that the vehicle is in the idling stop state. Then, the idling stop detector 320 defines the measured stop period of the engine as an idling stop period (hereinafter referred to as an IS period), and generates idling stop detection information (hereinafter referred to as IS detection information) for the IS period and transmits this information to an ecological driving evaluation unit 340.

a-2. Detection Using a Second Condition

When the idling stop detector 320 detects the starting of the engine based on the engine revolution signal included in the engine control signals, the idling stop detector 320 initiates the measurement of a period (hereinafter referred to as a running wait period) extending from the starting of the engine until the vehicle actually departs with employing the detection timer 321. Thereafter, when the idling stop detector 320 detects the departure of the vehicle based on the vehicular velocity signal included in the engine control signals, the idling stop detector 320 terminates the measurement of the running wait period. Then, the idling stop detector 320 determines whether the time measured for the running wait period is within the time for a second predetermined period (e.g., three seconds).

Through this determination process, the idling stop detector 320 determines whether the vehicle has departed without an unwanted "idling the engine". When the measured running wait period is within the second predetermined period, the idling stop detector 320 determines that the vehicle is in the idling stop state. Then, the idling stop detector 320 defines the obtained running wait period as an IS period, and generates IS detection information representing the IS period and transmits this information to the ecological driving evaluation unit 340.

a-3. Detection Using a Third Condition

A third condition is especially provided upon the assumption a vehicle is a hybrid vehicle (a vehicle that activates an engine using electricity and gasoline). First, the idling stop detector 320 determines whether the vehicle is currently running with employing a vehicular velocity speed included in the engine control signals. After idling stop detector 320 determines whether the vehicle is currently running, the idling stop detector 320 determines whether the engine is stopped with employing an engine revolution signal included in the engine control signals to. When the idling stop detector 320 determines that the vehicle is currently running and the engine is stopped, the idling stop detector 320 measures the period at which this state (i.e., the idling stop state) is maintained. Then, the idling stop detector 320 defines the obtained period as an IS period, and generates IS detection information representing the IS period and transmits this information to the ecological driving evaluation unit 340.

a-4. Detection Using a Fourth Condition

The idling stop detector 320 determines whether the engine is stopped with employing a running state such as an engine revolution signal included in the engine control signals. When the idling stop detector 320 determines that the engine is stopped, the idling stop detector 320 determines whether a person is present in the vehicle with employing a human sensor signal. Through this process, the idling stop detector 320 determines whether the engine is stopped for an idling stop (a user is in the vehicle), or whether the engine is stopped because of the vehicle is simply being parked in a parking lot (the user is outside the vehicle). When the idling stop detector 320 determines that the user is in the vehicle and the engine is stopped, the idling stop detector 320 measures the period at which this state, i.e., the idling stop state, is maintained. The idling stop detector 320 then defines the obtained period as an IS period, and generates IS detection information representing the IS period and transmits this information to the ecological driving evaluation unit 340.

a-5. Detection Using a Fifth Condition

In the same manner, the idling stop detector 320 determines whether the engine is stopped with employing an engine revolution signal included in the engine control signals. When the idling stop detector 320 determines that the engine is stopped, the idling stop detector 320 determines whether a key has been inserted into an engine switch, i.e., whether the engine is in a so-called key-in state with employing an engine switch state detection signal. This determination process is performed for the same reason as for the fourth condition. When the idling stop detector 320 determines that a user is in the vehicle and the engine is stopped, the idling stop detector 320 measures the period at which this state, i.e., the idling stop state, is maintained. Then, the idling stop detector 320 defines the obtained period as an IS period, and generates IS detection information representing the IS period and transmits this information to the ecological driving evaluation unit 340.

In this embodiment, the presence of a user in a vehicle, i.e., the operation enabled state of the vehicle, has been determined by detecting whether a key was inserted into the engine switch. Recently, however, the use has gradually spread of vehicles that employ wireless keys, instead of keys that are inserted into an engine switch, so that an engine can be started or stopped, or the doors of the vehicle can be locked or unlocked by a wireless signal. For this type of vehicle, provided are a wireless key sensor for receiving a signal from a wireless key and determining whether the wireless key is present in the vehicle, and an engine stopping/starting switch for stopping or starting an engine. To start the engine of the vehicle, a user manipulates the engine stopping/starting switch to perform a predetermined starting operation while holding the wireless key in a pocket, for example. To halt the engine, the user manipulates the engine stopping/starting switch to perform a predetermined stop operation. The idling stop detector 320 mounted on this type of vehicle detects the presence of the wireless key in the vehicle and determines that the predetermined stop operation has been performed by manipulating the engine stopping/starting switch, and the idling stop detector 320 determines this state is an idling stop state and measures the period at which this state is maintained. Since thereafter, the processing is performed in the same manner as described above, no further explanation for this will be given. As is described above, for a vehicle that employs a wireless key to halt or start the engine and the insertion of a key into an engine switch is not required, this configuration can be employed to detect the idling stop state.

Referring again to FIG. 2, an energy-saving traveling detector 330 includes an energy-saving traveling detection table TA2 shown in FIG. 4. The energy-saving traveling detector 330 compares, with signals indicating individual running states of a vehicle that are received by the reception unit 310, individual conditions (first and second conditions) entered in the energy-saving traveling detection table TA2, and determines whether the vehicle is in the energy-saving traveling state. A detection method using these conditions will now be described in detail.

b-1. Detection Using a First Condition

The energy-saving traveling detector 330 determines whether the fuel consumption rate (mileage) at the current time, indicated by a mileage signal, is equal to or lower than a predetermined, energy-saving fuel consumption rate (e.g., Japanese 10.15 mode fuel consumption test). When the energy-saving traveling detector 330 determines that the current fuel consumption rate is equal to or lower than the energy-saving fuel consumption rate, the energy-saving traveling detector 330 measures the period at which this state, i.e., the energy-saving traveling state, is maintained. Then, the energy-saving traveling detector 330 defines the obtained period as an energy-saving traveling period (hereinafter referred to as an ES period), and generates energy-saving traveling detection information (hereinafter referred to as ES information) representing the ES period and transmits this information to the ecological driving evaluation unit 340.

b-2. Detection Using a Second Condition

The energy-saving traveling detector 330 determines whether the vehicle is currently traveling with employing a vehicular velocity signal included in the engine control signals. When the energy-saving traveling detector 330 determines the vehicle is currently traveling, the energy-saving traveling detector 330 determines whether the vehicle has been accelerated, i.e., whether the acceleration pedal has been depressed further with employing an acceleration state detection signal. When the energy-saving traveling detector 330 determines that the vehicle is currently traveling but has not been accelerated, the energy-saving traveling detector 330 measures the period at which this state, i.e., the energy-saving traveling state, is maintained. Then, the energy-saving traveling detector 330 defines the thus obtained period as an ES period, and generates ES detection information representing the ES period and transmits this information to the ecological driving evaluation unit 340.

Referring again to FIG. 2, based on the IS detection information generated by the idling stop detector 320 and the ES detection information generated by the energy-saving traveling detector 330, the ecological driving evaluation unit 340 evaluates how environmentally friendly the user's driving has been (ecological driving evaluation).

More specifically, the ecological driving evaluation unit 340 receives the IS and ES detection information and examines a coefficient management table TA3 (see FIG. 5) stored in a first storage unit 350. As is shown in FIG. 5, for the idling stop state and the energy-saving traveling state, detection conditions and coefficients are entered in the coefficient management table TA3, correlated with each other. Upon receiving the IS or ES detection information, the ecological driving evaluation unit 340 examines the coefficient management table TA3 by using, as a search key, a detection condition indicated by the detection information, and extracts a corresponding coefficient that is used to perform weighting.

As an example, when the ecological driving evaluation unit 340 receives, from the idling stop detector 320, IS detection information indicating detection results acquired using the "first condition", the ecological driving evaluation unit 340 extracts, from the coefficient management table TA3, a coefficient "α1" that matches this condition. Then, the ecological driving evaluation unit 340 obtains an evaluation value vis by multiplying the extracted coefficient α1 by an IS period included in the IS detection information, and stores this value vis in a second storage unit 360.

Similarly, when the ecological driving evaluation unit 340 receives the ES detection information from the energy-saving traveling detector 330, the ecological driving evaluation unit 340 extracts, from the coefficient management table TA3, a coefficient (e.g., "β2") that matches an indicated search condition (e.g., a "second condition") in the ES detection information. Then, the ecological driving evaluation unit 340 obtains an evaluation value ved by multiplying the extracted coefficient β2 by the ES period included in the ES detection information, and stores the value ved in the second storage unit 360.

In parallel to this processing, the ecological driving evaluation unit 340 sequentially determines whether the traveling distance of the vehicle equals a predetermined travel evaluation distance. Specifically, the ecological driving evaluation unit 340 determines whether the distance traveled, which is measured by the odometer and is received from the reception unit 310, equals the traveling evaluation distance that has been registered in advance in the first storage unit 350. When the ecological driving evaluation unit 340 determines that the distance the vehicle has traveled equals the traveling evaluation distance, the ecological driving evaluation unit 340 reads all the evaluation values vis and ved that currently are stored in the second storage unit 360, and obtains an ecological driving evaluation index Vd by calculating all the evaluation values vis and ved (for example, adding all the evaluation values vis and ved).

The ecological driving evaluation index Vd indicates how the user has aimed to (or has made an effort to) drive environmentally friendly, and as the user's aim to drive ecologically friendly increases, the ecological driving evaluation index Vd level rises; while when the user's aim to drive ecologically friendly lessens, the ecological driving evaluation index Vd level is lowered. That is, the ecological driving evaluation index Vd represents an evaluation of the "level of the effort made by each user", and does not merely represent a reduction in the fuel consumption level. When simply a reduction in the fuel consumption is employed for an evaluation, the same evaluation value would be provided for an idling stop of about ten minutes for a large vehicle (e.g., a large truck) that produces a large amount of exhaust gas, and an idling stop of about ten hours for a hybrid car. In this embodiment, the level of the effort made by a user is evaluated, not a fuel consumption reduction, and as is described above, an "idling stop or energy-saving traveling period" is employed to obtain the ecological driving evaluation index Vd.

Referring again to the explanation of the detection method, after the ecological driving evaluation unit 340 has obtained the ecological driving evaluation index vd, the ecological driving evaluation unit 340 transmits, to a communication unit 380, the ecological driving evaluation index Vd as ecological driving evaluation information. Further, the ecological driving evaluation unit 340 examines a visual image conversion table TA4 shown in FIG. 6 in order to display as a visual image, on a display unit 370, such as a liquid crystal display panel, the ecological driving evaluation information.

As is shown in FIG. 6, in the visual image conversion table TA4, evaluation index ranges and image types are registered in correlation with each other. Specifically, such information is registered that indicates a first image is selected when the ecological driving evaluation index Vd is a or greater, that a second image is selected when the ecological driving evaluation index Vd is b (<a) or greater and is smaller than a, . . . , and that an n-th image is selected when the ecological driving evaluation index Vd is smaller than z (<y).

As is shown in FIG. 7, the individual images are formed using different character messages, i.e., the first image is formed using a character message in which the attitude of a user towards ecological driving is represented by the "highest level" (see A in FIG. 7), the second image is formed using a character message in which the attitude of a user towards ecological driving is represented by a "satisfactory level" (see B in FIG. 7), . . . , and the n-th image is formed using a character message in which the attitude of a user towards ecological driving is represented by the "lowest level" (see C in FIG. 7). The image information used for displaying the first to the n-th images is stored in an image database (not shown).

The ecological driving evaluation unit 340 determines the visual image type that corresponds to the obtained ecological driving evaluation index Vd with referring to the visual image conversion table TA4, and extracts the visual image from the image database and displays it on the display unit 370.

The user who drives the vehicle can refer to the visual image on the display unit 370 and apprehend "how much he or she aimed to drive ecologically". In this explanation, the ecological driving evaluation results are displayed on the display unit 370. However, an audio message may be used to provide the ecological driving evaluation results for the user.

Referring again to the explanation of the detection method, when the communication unit 380 receives, from the ecological driving evaluation unit 340, the ecological driving evaluation information representing the ecological driving evaluation index Vd, the communication unit 380 provides for the ecological driving evaluation information a unique user ID for identifying the user, such as a user name or a contact address, and transmits this information to the privilege granting server 500 through the communication network 400. It should be noted that the user ID must be registered in advance in the personal database (not shown) of the ecological driving evaluation unit 300.

<Privilege Granting Server 500>

The privilege granting server 500 is an apparatus that employs the ecological driving evaluation information received from the ecological driving evaluation unit 300 to provide various privileges for a user who drives a vehicle.

A communication unit 510 receives the ecological driving evaluation information from the ecological driving evaluation apparatus 300 through the communication network 400, and transmits the ecological driving evaluation information to a privilege granting controller 520.

The privilege granting controller 520 includes a CPU, a ROM and a RAM, and intensively controls the individual sections of the privilege granting server 500. When the privilege granting controller 520 receives the ecological driving evaluation information from the communication unit 510, the privilege granting controller 520 converts this information into a privilege point that it stores in a privilege point accumulation database 540.

FIG. 8 is a diagram showing example data registered in a privilege granting point conversion table TA5 stored in the privilege granting database 530, and FIG. 9 is a diagram showing a user point management table TA6 stored in the privilege point accumulation database 540.

As is shown in FIG. 8, in the privilege granting point conversion table TA5, an evaluation index range and the privilege granting points are entered in correlation with each other. Specifically, information is registered that indicates the provision of m points when the ecological driving evaluation index Vd is a or greater, the provision of (m-1) points when the ecological driving evaluation index Vd is b or greater and is smaller than a, . . . , and the inhibition of point provision, i.e., the provision of no points, when the ecological driving evaluation index Vd is smaller than z.

As is apparent from FIGS. 8 and 9, the privilege granting points is set so that it increases as the ecological driving evaluation index Vd rating rises, i.e., the level of the effort to drive ecologically becomes higher. In this embodiment, the privilege granting point conversion table TA5 is employed to obtain the privilege granting points. However, the method for acquiring the privilege granting points can be appropriately changed depending on the type of privilege to be granted, e.g., the privilege granting points may be obtained by multiplying the ecological driving evaluation index Vd by a predetermined coefficient.

After the privilege granting controller 520 has obtained the privilege granting points with referring to the ecological driving evaluation index Vd, which is represented by the ecological driving evaluation information and the privilege granting point conversion table TA5, the privilege granting controller 520 stores the privilege granting points obtained in the user point management table TA6 of the privilege point accumulation database 540.

The user point management table TA6 shown in FIG. 9 is used to manage the point accumulation states of users who employ the ecological driving evaluation system 100. In the user point management table TA6, a user ID for identifying each user, the accumulated user points representing the points accumulated by each user during a specific period of time (e.g., one month), and the fuel granting points, representing fuel points to be granted to a user, are registered in correlation with each other.

When the privilege granting controller 520 has obtained privilege granting points in the above described manner, the privilege granting controller 520 examines the user ID indicated in the ecological driving evaluation information, and determines the user for whom the obtained privilege granting points should be provided. As an example, when the user ID indicated in the ecological driving evaluation information is "U-1", the privilege granting controller 520 adds the obtained privilege granting points (e.g., m points) to a corresponding user's accumulated points, and obtains the updated accumulated points for the user. At the same time, the privilege granting controller 520 multiplies the points accumulated by the user by a predetermined fuel point calculation coefficient, and updates the fuel granting points.

The following example method is employed to grant a privilege, i.e., the provision of a fuel such as gasoline, in accordance with the ecological driving evaluation. The privilege granting server 500 collaborates with individual fuel supply companies, and contacts them to provide fuel for individual users in consonance with the fuel granting points. When a user supplements fuel at gas stations located at various places, the user accepts service in consonance with the fuel granting points. This method is merely an example, and a method for calculating the return fee points can be appropriately changed.

Referring again to the configuration of the privilege granting server 500, the privilege granting controller 520 updates the user accumulated points and the fuel granting points in accordance with the ecological driving evaluation information that has been sequentially received from the ecological driving evaluation apparatus 300 for a specific period of time, such as one month. When the specific period of time has elapsed, the privilege granting controller 520 deletes these points, and updates the points number.

When a user driving a vehicle desires to know his or her accumulated points, the user appropriately manipulates the operating unit (not shown) of the ecological driving evaluation apparatus 300, and accesses the privilege granting server 500.

Upon receiving an access request from the ecological driving evaluation apparatus 300, the privilege granting server 500 performs a user verification by using the user ID included in the access request. When the verification is successful, the privilege granting server 500 extracts the accumulated points for the corresponding user, and fuel granting points from the user point management table TA6 (see FIG. 9) in the privilege point accumulation database 540, and transmits these points to the ecological driving evaluation apparatus 300.

As a result, the screen shown in FIG. 10 is displayed on the display unit 370 of the ecological driving evaluation apparatus 300. All users can examine the screen on the display unit 370 and can know what privileges are available by aiming at ecological driving.

As is described above, according to the ecological driving evaluation system 100 of this embodiment, each user driving a vehicle can be evaluated in accordance with the effort made to drive ecologically (i.e., the period wherein the user has aimed to drive ecologically), and can obtain the evaluation results.

Through this evaluation, the aim of each driver to drive ecologically is reinforced, and the promotion of ecological driving is obtained.

Furthermore, since a user can accept various privileges in accordance with the level of his or her effort to drive ecologically, the aim of the user to drive ecologically can be reinforced.

Further, when ecological driving is promoted, exhaust gas from vehicles is reduced, and accordingly, various environmental problems, such as air pollution and global warming, can be alleviated.

B. Modifications

The preferred embodiment of the present invention has been explained; however, this embodiment is merely an example, and can be variously modified, without departing from the objective of the invention, and in addition, the following example modifications are available.

(Modification 1)

In the embodiment, an explanation has been given for a case that the stopping/starting of the engine is detected based on an engine revolution signal included in engine control signals. However, the stopping/starting of the engine can also be detected based on any other running state concerning a vehicle, including an engine sound signal output through a microphone or an exhaust temperature sensor signal, transmitted with the engine control signals, which enable the detection of the stopping/starting of the engine. This also applies to the detection of the stopping/starting of a vehicle, the detection of the presence of a person in a vehicle, the calculation of the fuel consumption rate, and the determination of whether an acceleration operation has been performed, all of which have been described in the embodiment. Furthermore, when the IS device (see the sub-division of prior art) is mounted on the in-vehicle apparatus 200, a detection signal indicating whether the IS device is currently operating may be employed to determine whether the engine is stopped.

(Modification 2)

Figure 11:
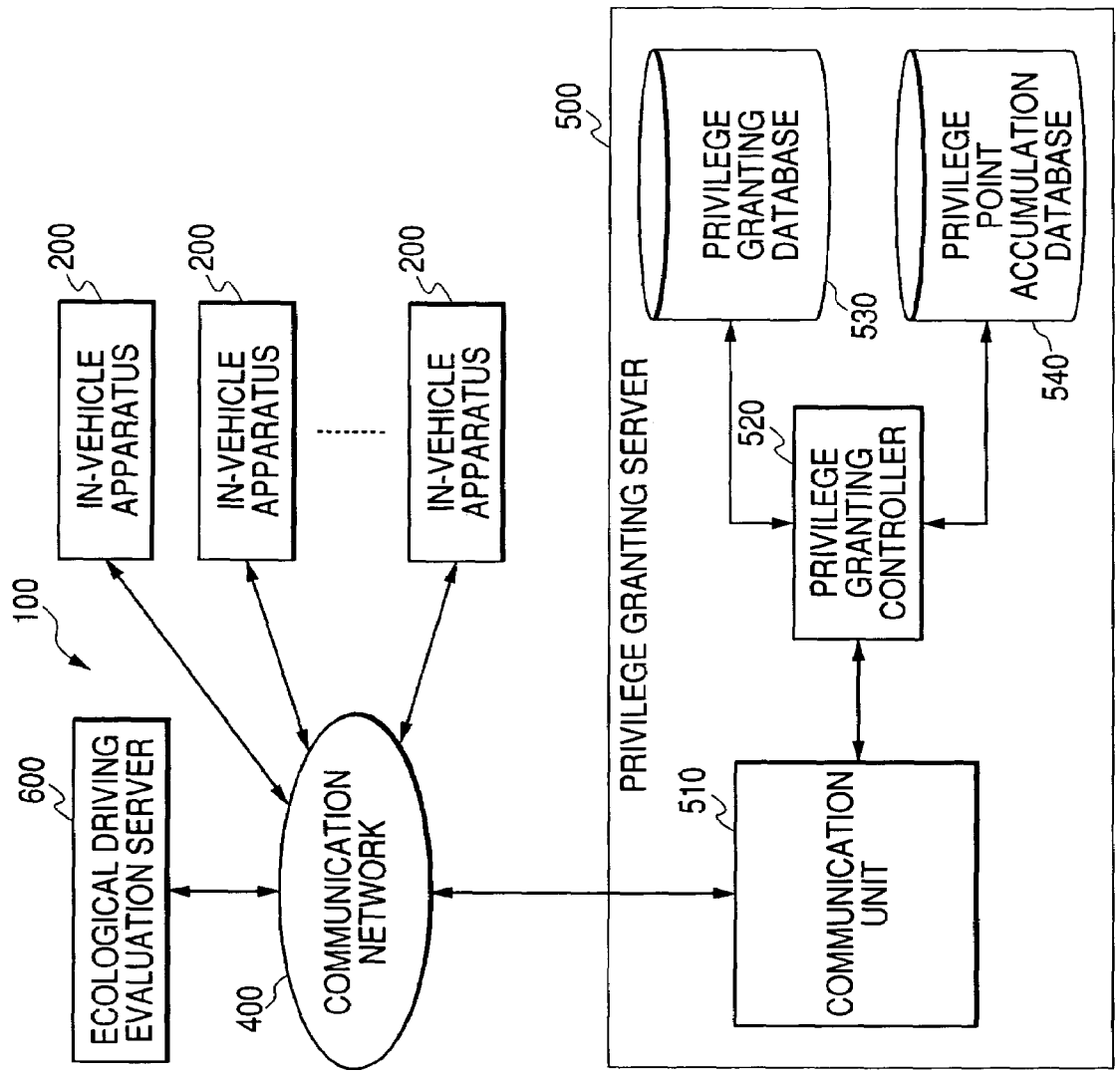
FIG. 11 is a diagram showing the configuration of an ecological driving evaluation system according to modification 2.

In this embodiment, the ecological driving evaluation apparatus 200 has been provided for each user; however, as is shown in FIG. 11, an ecological driving evaluation server 600 may also be provided across a communication network 400.

The ecological driving evaluation server 600 for this modification has substantially the same function as has the ecological driving evaluation apparatus 300 for the above embodiment. The ecological driving evaluation server 600 receives, from an in-vehicle apparatus 200 provided for each vehicle, running states concerning the vehicle, such as engine control signals, as well as a user ID. The ecological driving evaluation server 600 calculates an ecological driving evaluation index Vd based on the running states recorded for the corresponding vehicle, and generates ecological evaluation information and stores this information in a database (not shown). When a user desires to access his or her ecological driving evaluation, the user employs a client terminal (not shown), such as a personal computer, to access the ecological driving evaluation server 600. Upon receiving the access request, the ecological driving evaluation server 600 extracts, from the database, the ecological evaluation information for the corresponding user, and transmits the information to the client terminal through the communication network 400.

When the ecological driving evaluation server 600 is provided on the communication network 400, as in this modification, the function of the privilege granting server 500 may be assumed by the ecological driving evaluation server 600 so as to integrate the ecological driving evaluation server 600 and the privilege granting server 500.

(Modification 3)

In the embodiment, a privilege for providing fuel in accordance with the ecological driving evaluation has been employed as an example. However, a privilege for which a specific premium is offered may be employed.

For example, a predetermined premium is offered when the user's accumulated points recorded in the user point management table TA6 (see FIG. 9) exceed a predetermined points. Specifically, when the user's accumulated points exceed 100 points, 300 points or 800 points, a CD player, a digital camera or a liquid crystal television set is offered. The user may continue to accumulate points until the points required for a desired premium, such as a digital camera, have been acquired, and the user can obtain the desired premium. When a premium has been awarded to the user, the current accumulated points is cleared, and the accumulation of points is restarted at "0". In this manner, a desired premium (or a tradable coupon) may be offered that corresponds with the points accumulated by the user.

(Modification 4)

In the embodiment, the first to fifth conditions (see FIG. 3) are employed as conditions for detecting the idling stop state of a vehicle, and the first and second conditions (see FIG. 4) are employed for determining the energy-saving traveling state of a vehicle. However, conditions used to detect these states can be appropriately changed in accordance with the configuration of the ecological driving evaluation system 110.

(Modification 5)

In the embodiment, an explanation has been given for the mode for performing an ecological driving evaluation based on a period at which a vehicle was in the idling stop state, and a period at which the vehicle was in the energy-saving traveling state. However, the number of times at which the vehicle was in the idling stop state and the number of times at which the vehicle was in the energy-saving traveling state may be detected, and the ecological driving evaluation may be performed based on the counts that are detected. For example, each time the idling stop detector 320 detects an idling stop state for the vehicle based, for example, on the engine revolution signal, the count value (an initial value of "0") of an idling stop detection counter (not shown) is incremented by one. Similarly, each time the energy-saving traveling detector 330 detects the energy-saving traveling state, the count value (an initial value of "0") of an energy-saving traveling detection counter (not shown) is incremented by one. The ecological driving evaluation unit 340 then examines the count values held by these counters and performs an ecological driving evaluation. In this mode, the effort of a user to drive ecologically can also be correctly evaluated. As is described above, according to this invention, any appropriate method can be employed, depending on the configuration of the ecological driving evaluation system 100, so long as the evaluation can be performed in accordance with the level of the effort to drive ecologically, i.e., the attitude of the user that is reflected by the user's effort. For energy-saving traveling, the ecological driving evaluation may be performed based on the distance that the vehicle travelled in an energy-saving mode (the energy-saving traveling distance). Further, naturally, the ecological driving evaluation can be performed by using both the technique of this modification and the technique of the embodiment of the invention.

(Modification 6)

Instead of the period of the idling stop state and the period of the energy-saving traveling state, the amount of fuel consumed by the our unit (first estimated fuel consumption amount), which would have been consumed if the vehicle had not been in the idling stop state, or the amount of fuel consumed by the hour unit (second estimated fuel consumption amount), which would have been consumed if the vehicle had not been in the energy-saving traveling state, may be taken into account to perform the ecological driving evaluation.

As an example, when the idling stop detector 320 obtains the period of time in the idling stop state, the idling stop detector 320 reads the first estimated fuel consumption amount from a memory (not shown), and multiplies the period of time in the idling stop state by the first estimated fuel consumption amount. Similarly, when the energy-saving traveling detector 330 obtains the period of time for the energy-saving traveling state, the energy-saving traveling detector 330 reads the second estimated fuel consumption amount from a memory (not shown) and multiples the period of time in the energy-saving traveling state by the second estimated fuel consumption amount. The ecological driving evaluation unit 340 calculates a difference between the estimated fuel consumption amount, which is the result obtained by multiplication, and the amount of fuel actually consumed, and performs the ecological driving evaluation based on the obtained difference. Instead of storing the first and the second estimated fuel consumption amounts, the first estimated fuel consumption amount may be estimated based on the running state, such as a fuel consumption rate, of the vehicle before it entered the idling stop state, while the second estimated fuel consumption may be estimated based on the running state, such as the fuel consumption rate, of the vehicle before it entered the energy-waving traveling state. Further, a first estimated exhaust gas amount and a second estimated exhaust gas amount may be employed instead of the first and the second estimated fuel consumption amounts.

(Modification 7)

In the embodiment of the invention, the ecological driving evaluation index Vd is calculated when the traveling distance of the vehicle equals a predetermined evaluation traveling distance. However, the timing for obtaining the ecological driving evaluation index Vd can be appropriately changed, e.g., the ecological driving evaluation index Vd may be obtained when a predetermined period of time, such as 100 hours, has elapsed since the measurement was started.

(Modification 8)

The function of the ecological driving evaluation unit 340 according to the embodiment can be provided by using either software or hardware. When software is employed to provide the function, a function equivalent to that performed by the ecological driving evaluation unit 340 may be provided for the ecological driving evaluation apparatus 300 through a recording medium on which this software is recorded, or may be provided for the ecological driving evaluation apparatus 300, across the Internet, by a server for which the software is provided.

(Modification 9)

In the embodiment, the present invention has been applied for a vehicle. However, the subject of the invention is not limited to this, and can be applied any engine-mounting machine that comprises an operating mechanism that is operated by using, as power, energy that is obtained by burning fuel.

For example, the invention can be applied for power generators and transportation devices (e.g., ships and planes) that include an operating mechanism operated by using, as power, energy obtained by burning a fuel, regardless of whether it is a liquid, a gas or a solid. When the invention is applied for a power generator, the operating state, such as the action state or the stop state, of the operating mechanism is detected based on a running state, such as a heating value, of the power generator that is measured by a monitoring device (not shown), and the energy-saving evaluation is performed based on the detection results. More specifically, it is assumed that the stop state of the operating mechanism, i.e., the state that fuel is not being burnt is the energy-saving state, and the period at which the stop state is maintained or the number of times in which the apparatus is in the stop state is detected to perform the energy-saving evaluation. As is described above, the present invention can also be applied for an engine-mounting apparatus.

(Modification 10)

In the embodiment of the invention and the previous modifications, an ecological driving evaluation has been performed for an actual vehicle. However, an ecological driving evaluation may be performed for a virtual vehicle. Specifically, the technical idea of the embodiment is employed unchanged for a vehicle traveling simulation game during a participant can experience the emotions of a driver, and the ecological driving evaluation is performed based on the traveling of the virtual vehicle operated by the user. A vehicle traveling simulation game will now be described. A user appropriately manipulates the controller (not shown) of a game machine, and thereby enables a virtual vehicle, displayed on a screen, to travel along various routes (e.g., from Tokyo to Hakata). During this process, situations are encountered, such as one where a user is for waiting for a signal to change, that it is supposed the user would encounter if he or she was actually driving a vehicle. In this modification, when such a situation is encountered, a running state, such as the engine revolutions, of the virtual vehicle is employed to determine whether the game participant, the user, properly controlled the virtual vehicle during the idling stop, or whether the user's aim was energy-saving traveling.

As is described above, an ecological driving evaluation may be performed not only for an actual vehicle, but also for a virtual vehicle. Naturally, the energy-saving evaluation can be performed in the same manner.

As is described above, according to the present invention, an energy-saving evaluation can be performed, in accordance with the effort made by each user, to determine how environmentally friendly the user employed the engine-mounting apparatus. Further, an ecological driving evaluation can be performed, in accordance with the effort made by each user, to determine how environmentally friendly the user drove a vehicle.

What is claimed is:

1. An energy-saving evaluation apparatus for evaluating energy conservation for a machine that is to be operated by a user, the energy-saving evaluation apparatus comprising: a detection unit that includes a monitor device for measuring a running state of the machine and detects an operating state of the machine operated by the user through measuring the running state of the machine by the monitor device, wherein the running state of the vehicle includes a velocity of the vehicle, a number of revolutions of an engine of the vehicle, and the heat, vibrations and sounds generated by the engine; and an evaluation unit that performs an energy-saving evaluation based on the detected operating state of the machine, wherein the evaluation unit performs the energy-saving evaluation based on the detected operating state of the machine over a predetermined period of time and the machine is a transportation facility.

2. The apparatus according to claim 1, wherein the machine is powered by an operating mechanism driven by energy produced by burning fuel.

3. The apparatus according to claim 2, wherein the machine is an electric power generator that is powered by an operating mechanism driven by the energy produced by burning fuel.

4. The apparatus according to claim 1, wherein
the operating state is selected from the group comprising an active state and a stop state, and
the apparatus further includes a counting unit that counts a number of times during which the machine operating state is set to the stop state, and
the evaluation unit performs the energy-saving evaluation based on the number of times the stop state is detected during the predetermined period of time.

5. The apparatus according to claim 1, wherein
the operating state is selected from the group comprising an action state and a stop state, and
the apparatus further includes a measurement unit that measures a length of time during which the machine operating state is set to the stop state, and
the evaluation unit performs the energy-saving evaluation based on the length of time the stop state is maintained during the predetermined period of time.

6. The apparatus according to claim 1, wherein the transportation facility is selected from the group comprising a ship, a plane, and a vehicle.

7. The apparatus according to claim 6, wherein
the transportation facility is the vehicle, and
the detecting unit detects, as the operating state, whether or not the vehicle is in an idling stop state based on the running state of the vehicle measured by the monitor device.

8. The apparatus according to claim 7, further including a counting unit that counts a number of times the vehicle is in the idling stop state, and
wherein the evaluation unit performs the energy saving evaluation based on the number of times at which the idling stop state is detected during a predetermined time period.

9. The apparatus according to claim 8, wherein the detection unit detects whether an engine of the vehicle is stopped or started based on the running state and determines the idling stop state when a period from the detection of the stop of the engine until the detection of the starting of the engine is less than a predetermined threshold value.

10. The apparatus according to claim 8, wherein the detection unit detects whether an engine of the vehicle is stopped or started based on the running state and whether the vehicle is stopped or traveling based on the running state, and determines the idling stop state when a period from the detection of the starting of the engine until the detection of the traveling of the vehicle is less than a predetermined threshold value.

11. The apparatus according to claim 8, wherein the detection unit detects whether an engine of the vehicle is stopped or started based on the running state and whether the vehicle is stopped or traveling based on the running state, and determines the vehicle is in the idling stop state when the stop of the engine is detected while the traveling of the vehicle is being detected.

12. The apparatus according to claim 7, further including a measurement unit that measures a length of time the vehicle is in the idling stop state, and
wherein the evaluation unit performs the energy saving evaluation based on the length of time the idling stop state is maintained during a predetermined period of time.

13. The apparatus according to claim 12, wherein the detection unit detects whether an engine of the vehicle is stopped or started based on the running state and determines the idling stop state when a period from the detection of the stop of the engine until the detection of the starting of the engine is less than a predetermined threshold value.

14. The apparatus according to claim 12, wherein the detection unit detects whether an engine of the vehicle is stopped or started based on one of the running states and whether the vehicle is stopped or traveling based on another running state, and determines the idling stop state when a period from the detection of the starting of the engine until the detection of the traveling of the vehicle is less than a predetermined threshold value.

15. The apparatus according to claim 12, wherein the detection unit detects whether an engine of the vehicle is stopped or started based on the running state and whether the vehicle is stopped or traveling based on the running state, and determines the vehicle is in the idling stop state when the stop of the engine is detected while the traveling of the vehicle is being detected.

16. The apparatus according to claim 7, wherein the running state of the vehicle includes a velocity of the vehicle, a number of revolutions of an engine of the vehicle, and the heat, vibrations and sounds generated by the engine.

17. The apparatus according to claim 7, wherein the detection unit detects a presence of the user in the vehicle and whether an engine of the vehicle is stopped or started based on the running state, and determines the vehicle is in the idling stop state when both the stop of the engine and the presence of the user in the vehicle are detected.

18. The apparatus according to claim 7, wherein the detection unit determines whether a key is inserted into an engine switch in the vehicle to change the state of engine based on the running state, and determines the vehicle is in the idling stop state when both the stop of the engine and the presence of the key in the engine switch are detected.

19. The apparatus according to claim 6, wherein
the transportation facility is the vehicle,
the detection unit includes a calculation unit that calculates a fuel consumption rate for an engine of the vehicle based on a travel distance of the vehicle and an amount of fuel consumed during the travel,
the apparatus further includes a measurement unit that measures, as an energy-saving traveling period, a length of period during which the fuel consumption rate is smaller than a predetermined threshold value, and
the evaluation unit performs the energy-saving evaluation based on the energy-saving traveling period.

20. The apparatus according to claim 19, wherein the measurement unit measures, as an energy-saving traveling distance, the travel distance of the vehicle for which the fuel consumption rate is smaller than the predetermined threshold value, and the evaluation unit performs an ecological driving evaluation based on the energy-saving traveling distance.

21. The apparatus according to claim 6, wherein
the transportation facility is the vehicle,
the detection unit detects whether the vehicle is stopped or traveling based on the running state of the vehicle that are measured by the monitor device, and determines whether an acceleration operation is performed for the vehicle,
the apparatus further includes a measurement unit that measures, as a energy-saving traveling period, a period during which the traveling of the vehicle is detected and it is determined that the acceleration operation is not performed, and
the evaluation unit performs the energy saving evaluation based on the energy-saving traveling period.

22. The apparatus according to claim 21, wherein
the measurement unit detects a traveling distance of the vehicle in a period during which the vehicle is traveled and the acceleration operation is not performed, and defines the obtained traveling distance as an energy-saving traveling distance, and
the evaluation unit performs the energy-saving evaluation based on the energy-saving traveling distance.

23. The apparatus according to claim 1, further including a notification unit that notifies the user of the results of the energy saving evaluation.

24. The apparatus according to claim 1, wherein the evaluation unit further determines an ecological driving evaluation index which indicates an energy-saving effort level for the user.

25. A method of evaluating energy conservation for a machine that is to be operated by a user, the method comprising: measuring a running state of the machine, wherein the running state of the vehicle includes a velocity of the vehicle, a number of revolutions of an engine of the vehicle, and the heat, vibrations and sounds generated by the engine; detecting an operating state of the machine operated by the user over a predetermined period of time based on the measured running state; and performing an energy-saving evaluation based on the detected operating state of the machine, wherein the machine is a transportation facility.

26. An energy-saving evaluation system comprising:
an energy-saving evaluation apparatus for evaluating energy conservation for a machine that is to be operated by a user, the energy-saving evaluation apparatus including:
a detection unit that includes a monitor device for measuring a running state of the machine, detects an operating state of the machine operated by the user through measuring the running state of the machine by the monitor device, an evaluation unit that performs an energy-saving evaluation based on the detected operating state of the machine, and a transmission unit that transmits energy-saving evaluation information representing the result of the energy-saving evaluation to a privilege granting server; and the privilege granting server that provides privileges to the user according to accumulated points, the privilege granting server including:

a reception unit that receives the energy-saving evaluation information from the transmission unit, a storage unit that stores the accumulated points, and a control unit that obtains privilege points based on the energy-saving evaluation information, and employs the obtained privilege points to update the accumulated points.

27. The system according to claim 26, wherein the transmission unit transmits the energy-saving evaluation information with adding identification information for the user thereto.

28. The system according to claim 27, wherein the control unit updates the accumulated points that corresponds to the identification information added to the energy-saving evaluation information to be employed by the control unit.

29. The system according to claim 26, wherein the transmission unit transmits the energy-saving evaluation information to the reception unit through a communication network.

30. The system according to claim 26, wherein the machine is a vehicle, the detection unit determines whether the vehicle is in an idling stop state or not based on the running state of the vehicle, and the evaluation unit performs an ecological driving evaluation as the energy-saving evaluation based on the determination result of the detection unit.

31. An energy saving evaluation method comprising:

measuring a running state of a machine that is to be operated by a user;

detecting an operating state of the machine operated by the user based on the measured running state;

performing an energy-saving evaluation based on the detected operating state of the machine;

transmitting an energy-saving evaluation information representing the results of energy-saving evaluation through a communication network;

receiving the energy-saving evaluation information;

obtaining privilege points based on the received energy-saving evaluation information;

updating, based on the obtained privilege points, the accumulated points according to which privileges are provided to the user; and storing the updated accumulated points.

* * * * *